Figure 1:
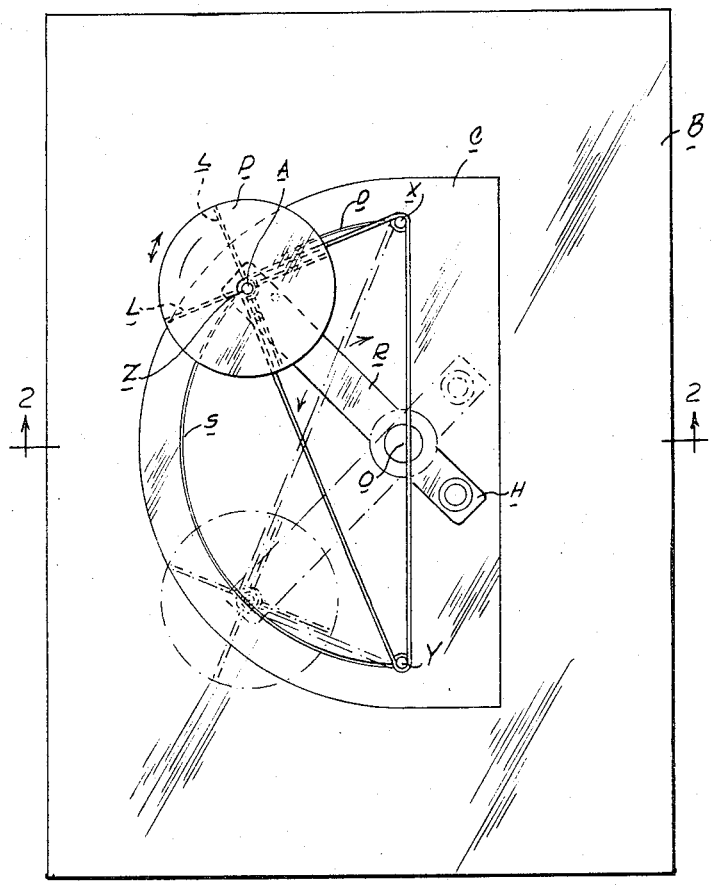

Sept. 12, 1967  C. SAVIN ETAL  3,340,624
DEVICE AND METHOD FOR DEMONSTRATING AN
ANGLE INSCRIBED IN A SEMI-CIRCLE
Filed Oct. 22, 1965

INVENTORS
CORNELIUS SAVIN
ALAN G. VORWALD
CHRISTOPHER P. VAGTS
BY
R. E. Meech
ATTORNEYS

United States Patent Office 3,340,624
Patented Sept. 12, 1967

3,340,624
DEVICE AND METHOD FOR DEMONSTRATING AN ANGLE INSCRIBED IN A SEMI-CIRCLE
Cornelius Savin, Westbury, Alan G. Vorwald, Bethpage, and Christopher R. Vagts, Huntington, N.Y., assignors to Antran Corporation, a corporation of New York
Filed Oct. 22, 1965, Ser. No. 500,776
7 Claims. (Cl. 35—34)

This invention relates to a device for visual presentation to large groups of students at one time by overhead projection of a transparent device, and more particularly, to a animated transparency device for and method of teaching mathematical concepts, especially in geometry, by use thereof.

Oftentimes it is difficult for a student especially if he is lacking in imaginative power to grasp the significance of mere drawn lines and their proposed super-position upon each other especially, for example, where geometric concepts are to be developed in relation to the circle, its characteristics, and measurement. The student's mind can often be helped if such circles, lines, angles, etc. can be represented in a tangible form. In order to overcome this disadvantage, a device is provided, in accordance with the present invention, whereby circles, lines, angles, etc. of various types are represented in concrete form and the parts of the device manipulated in order to illustrate many of the elementary geometrical terms and processes employed in making proofs necessary in this branch of mathematical science.

While various devices and methods have been heretofore suggested and used for teaching or training large groups by means of overhead projection of transparent devices, they were not entirely satisfactory. One such device heretofore suggested employed a so-called "still" transparency. Such "still" transparency devices are merely two-dimensional, while animated transparencies are tri-dimensional which is a decided advantage. Animation imparts a lively and more significant movement to the transparency and is much more easily understood. The modern method of teaching tends toward visualizing, manipulating and direct observation which is a decided advantage of teaching by animated transparencies. The inadequacies of these and other existing teaching means and methods is overcome by the present invention.

It is the general object of the present invention to provide animated teaching devices that overcome the insufficiencies of models, facimilies, cut-away and other means that have been previously employed to represent circles, angles, etc. for the purpose of teaching students and others.

It is another object of the invention to provide animated teaching devices of such character that each of the several components or parts of the assembly are readily visible and the relative movements of the related parts are all readily visible and understood. The several parts, or at least some of them, are constructed of transparent materials which are of different colors or shades for ready identification so that even though the parts are superimposed or positioned one within or behind the other, they are all immediately and readily recognizable and their several independent and mutual motions are clearly visible and understood.

It is a further object of this invention to provide a teaching aid of the animated transparency type which may be manipulated or actuated even by the student, himself, to observe the various components perform their respective functions and to solve the particular problem.

It is still another object of the present invention to provide animated transparency devices which are compact, light in weight and conveniently portable so as to facilitate handling, transporting, and storing of the devices.

It is still a further object of the invention to provide teaching devices of this type which are relatively inexpensive in their manufacture and which may be readily duplicated or produced in volume and, at the same time, efficient effective and instructive in their use.

It is a most important object of the present invention to provide a method of and means for teaching mathematical concepts by the overhead projection of animated transparency devices which visually demonstrates the particular problem to be solved.

It is still a more specific object of this invention to provide a method of teaching the geometric concepts of an inscribed angle in a semi-circle wherein a plurality of right triangles are formed within the semi-circle to illustrate visually that an angle inscribed in a semi-circle is always a right angle (90 degrees) and wherein the sides of the various right triangles are measured to establish the fact that the square on the hypotenuse equals the sum of the squares on the other two sides.

Various other objects and advantages of this invention will be more apparent in the course of the following specification, and will be particularly pointed out in the appended claims.

In the accompanying drawings, there is shown for the purpose of illustration, an embodiment which the invention may assume in practice.

Figure 2:
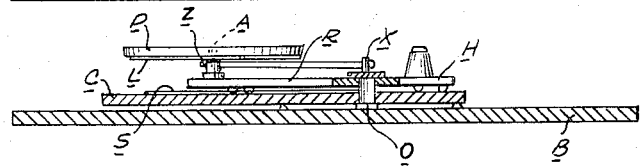
Figure 3:
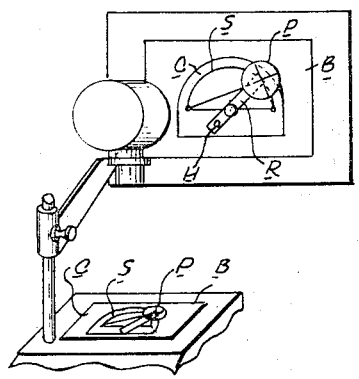

In these drawings:

FIG. 1 is a plan view of the animated transparency device in accordance with the present invention, FIG. 2 is a sectional view taken on line 2—2 of FIG. 1, and FIG. 3 is a perspective view of a portion of an overhead projector and screen used in connection with the visual demonstration of the animated transparency device of the present invention.

Referring more particularly to the drawings, the animated transparency device in accordance with the present invention consists preferably of a clear transparent plastic planar base B having a colored transparent semi-circular member C mounted thereon similar to the shape of a protractor with a semi-circle S inscribed thereon. Centrally of the diameter D of this semi-circle there is pivotally mounted, as at O on the member C, a rotatable member R having a handle portion H arranged at one end thereof and a pin-like projection A on the opposite free end thereof which is disposed directly opposite the semi-circle S. At each end of the diameter D of the semi-circle there is arranged on the member C, pin-like projections X and Y. There is also provided a circular protractor P having a pair of hair-lines L diametrically arranged thereon at right angles to one another and having a hole Z arranged in the center thereof in which the projection A is adapted to be positioned.

Having described the parts and the construction of the animated transparency device of the present invention, it functions and is used in the following manner.

The device is positioned on an overhead projection stage with the parts thereof satisfactorily focused on a screen in a well known manner. A flexible member such as an elastic band E is positioned around the projections X, Y and A, as shown in FIG. 1. The projection A on the rotatable member R is then positioned at any desired point on the semi-circle S by rotating the member R.

The three angles defined by the trangle thus formed by elastic band are then observed and examined.

The right angle protractor P is then positioned on the projection A of the rotatable member R, as shown in the full lines of FIG. 1 and it will be noted that the angle at the apex is 90 degrees.

The above steps are repeated for a number of points on the semi-circle, as shown in the broken lines of FIG. 1 and it will be seen and demonstrated that the angle inscribed in a semi-circle is always a right angle or 90 degrees. For each of the inscribed right angles in the semi-circle it will be seen that the intercepted arc remains 180 degrees. This is constant for the reason that the two prongs or points X and Y at each end of the diameter D are fixed. Thus, the relation between the inscribed angle and the intercepted arc may be established as 90 degrees=½ × 180 degrees or the angle inscribed in a circle is measured by one half its intercepted arc.

Demonstrate the relation between the sides of various right triangles inscribed in the semi-circle by measuring the sides preferably with a transparent ruler and it will be seen that a close approximate of the Pythagorean theorem will result, i.e. that in a right triangle the square on the hypotenuse equals the sum of the squares on the other sides.

As a result it will be seen that the animated transparency device in accordance with the present invention can be used to show that an angle inscribed in a semi-circle is always a right angle (90 degrees), to demonstrate the relation between an inscribed angle in a semi-circle and its intercepted arc, and to demonstrate the relationship between the three sides of a right triangle.

While there is shown and described an embodiment which the invention may assume in practice, it will be understood that this embodiment is merely for the purpose of illustration and description, and that other forms can be devised within the scope of the invention as defined in the appended claims.

We claim:

1. An animated transparency device adapted to be used with an overhead projector for teaching geometry comprising:
   a transparent member having a semi-circle arranged thereon,
   a fixed pin-like projection arranged at each end of the diameter of said semi-circle,
   a rotatable member having one end thereof pivotally attached to said member centrally of the diameter of said semi-circle,
   a pin-like projection arranged on the opposite free end of said rotatable member directly opposite the semi-circle, and
   a flexible member which is adapted to be positioned around both the fixed projections and the projection on said rotatable member so as to form a right triangle within said semi-circle at a number of locations upon movement of said rotatable member.

2. An animated transparency device, as defined in claim 1, including a right angle protractor which is adapted to be disposed on the projection on the rotatable member at each location thereof for determining the angle at the apex at said projection.

3. An animated transparency device adapted to be used with an overhead projector for teaching geometry comprising:
   a transparent planar base,
   a transparent member mounted on said base having a semi-circle inscribed thereon,
   a fixed projecting portion arranged at each end of the diameter of said semi-circle,
   a rotatable member having one end thereof pivotally connected to said member centrally of the diameter of the semi-circle.
   a projecting portion arranged on the opposite free end of said rotatable member at a point directly opposite the semi-circle, and an elastic band disposed around both the fixed projections and the projection on said rotatable members so as to form a right triangle within the semi-circle at a number of locations upon movement of said rotatable member.

4. An animated transparency device, as defined in claim 3, including a right angle protractor which is adapted to be disposed on the projection on the rotatable member at each location thereof for determining the angle at the apex at said projection.

5. An animated transparency device adapted to be used with an overhead projector for teaching geometry comprising a transparent planar base, a semi-circle configuration arranged on said base, a fixed pin arranged on said base at each end of the diameter of said semi-circle, a movable member having one end thereof pivotally attached to said base centrally of the diameter between said two fixed pins, the opposite free end of said member being movable around the semi-circular arc and a pin arranged on said free end which is adapted to be moved 180 degrees along said semi-circular arc, a circular protractor adapted to be mounted on the free end of said member having its axis positioned at said last mentioned pin, and an elastic band adapted to be stretched around the three pins to define a triangle within the semi-circle.

6. The method of teaching various mathematic concepts by overhead projection by use of an animated transparency device which comprises:
   providing a transparent planar base member having a semi-circular configuration arranged thereon, and a fixed pin-like projection arranged at each end of the diameter thereof,
   providing a rotatable arm-like member having one end pivotally supported at a point centrally of the diameter of said semi-circle and having a pin-like projection arranged on the opposite end thereof directly opposite the semi-circular configuration,
   disposing an elastic band around the fixed pin-like projections and the projection on said rotatable member so as to form a right angle triangle within said semi-circle,
   moving the rotatable member so that the projection thereon is positioned at a number of different locations around the semi-circle so that said elastic band forms several different right triangles, and
   measuring the angle at the apex at said projection at each location.

7. The method of teaching various mathematical concepts which projection by use of an animated transparency device, as defined in claim 6, including the step of measuring each side of the right triangle formed at each location by the elastic band and comparing them and demonstrating that the square on the hypotenuse equals the sum of the squares on the other sides.

References Cited

UNITED STATES PATENTS

| 1,955,392 | 4/1934 | Shimberg. | |
| 3,235,975 | 2/1966 | Pierson | 35—30 |

FOREIGN PATENTS 15,498   4/1907   Great Britain.

EUGENE R. CAPOZIO, *Primary Examiner.*

W. GRIEB, *Assistant Examiner.*